United States Patent
Garcia Blanco

(10) Patent No.: US 8,065,783 B2
(45) Date of Patent: Nov. 29, 2011

(54) BRAKE PIPE CONNECTION TO BRAKE HOSE

(75) Inventor: Joaquín Garcia Blanco, Castelldefels (ES)

(73) Assignee: J. Juan, S.A., Gava, Barcelona (ES)

( * ) Notice: Subject to any disclaimer, the term of this patent is extended or adjusted under 35 U.S.C. 154(b) by 177 days.

(21) Appl. No.: 12/360,593

(22) Filed: Jan. 27, 2009

(65) Prior Publication Data

US 2010/0187814 A1    Jul. 29, 2010

(30) Foreign Application Priority Data

Jan. 26, 2009  (EP) .................................... 09380009

(51) Int. Cl.
*F16L 25/00* (2006.01)
(52) U.S. Cl. ................. 29/458; 29/508; 29/515; 29/516; 29/517
(58) Field of Classification Search .................. 285/256; 29/557, 890.14, 890.144, 282, 458, 508, 29/515, 516, 517
See application file for complete search history.

(56) References Cited

U.S. PATENT DOCUMENTS

| | | | |
|---|---|---|---|
| 4,991,876 A * | 2/1991 | Mulvey ........................ | 285/256 |
| 5,037,142 A | 8/1991 | Helping | |
| 5,387,016 A * | 2/1995 | Joseph et al. ................. | 285/256 |
| 5,707,087 A | 1/1998 | Ridenour et al. | |
| 6,189,199 B1 * | 2/2001 | Ouchi et al. .................. | 285/256 |
| 6,270,126 B1 * | 8/2001 | Juedes ........................... | 285/256 |
| 6,276,400 B1 * | 8/2001 | Jackson et al. ................ | 138/143 |
| 6,447,020 B1 * | 9/2002 | Kacines et al. ............... | 285/256 |
| 6,619,698 B2 * | 9/2003 | Juedes ........................... | 285/256 |
| 6,619,699 B2 * | 9/2003 | Brumfield ..................... | 285/256 |
| 6,997,485 B2 * | 2/2006 | Souvatzidis .................. | 285/256 |
| 7,062,834 B2 * | 6/2006 | Patterson et al. ............. | 285/331 |
| 7,338,090 B2 * | 3/2008 | Baldwin et al. .............. | 285/256 |
| 7,566,078 B2 * | 7/2009 | Piccinali ....................... | 285/256 |
| 7,624,504 B2 * | 12/2009 | Watanabe ..................... | 285/256 |
| 7,819,437 B2 * | 10/2010 | Weil et al. .................... | 285/256 |
| 2003/0197372 A1* | 10/2003 | Hoff et al. .................... | 285/256 |
| 2005/0040646 A1* | 2/2005 | Brumfield et al. ............ | 285/256 |

FOREIGN PATENT DOCUMENTS

JP  2004-197915  7/2004
WO  WO 00/15995  3/2000

* cited by examiner

*Primary Examiner* — David E Bochna
(74) *Attorney, Agent, or Firm* — Merchant & Gould P.C.

(57) ABSTRACT

Brake pipe connection to a brake hose includes a fixing bushing through which the brake hose is inserted through a first side and a brake pipe through a second side. The brake pipe includes an external diameter $D_T$, a wall thickness $e_T$, and a connection end. The brake hose includes an internal diameter $d_H$ that is less than the external diameter $D_T$ of the brake pipe. The connection end includes a built-in pipette which is housed on the inside of the fixing bushing and inserted in the brake hose. The built-in pipette is formed by the stretching of the connection end to obtain an external diameter of the pipette $D_P$ that is less than the external diameter $D_T$ of the brake pipe, a pipette wall thickness $e_P$ that is less than the wall thickness $e_T$ of the brake pipe, and a pipette length $L_P$.

3 Claims, 4 Drawing Sheets

BRAKE PIPE CONNECTION TO BRAKE HOSE

This application claims benefit of Serial No. 2009380009.2, filed 26 Jan. 2009 in Europe and which application is incorporated herein by reference. To the extent appropriate, a claim of priority is made to the above disclosed application.

OBJECT OF THE INVENTION

The present invention refers to a brake pipe connection to a brake hose especially suitable for hydraulic brake lines in motor vehicles. It is also an object of the present invention a hydraulic brake line which uses said connection and an assembly process thereof.

BACKGROUND OF THE INVENTION

The components to be mounted in the motor vehicles driven in roads, such as motorcycles and automobiles, have to comply with strict regulations which guarantee their maximum safety and reliability.

Hydraulic brake lines, among others, are components whose performance in the vehicle has a direct impact on its safety and reliability. Hydraulic brake lines, also known as brake lines, consist of a hydraulic circuit capable of pressurized fluid transmission between the different components forming a brake system, such as for example between the master cylinder and the ABS system, between the ABS set and the brake caliper or directly between the master cylinder and the brake caliper. The hydraulic brake lines usually comprise brake pipes, brake hoses and union terminals to the aforementioned equipment or other equipment. The combination of brake pipes and brake hoses allows reducing the efforts of the hydraulic brake lines itself and the vibrations transmitted to the different components of the vehicle, as well as allowing the movement of certain components of the vehicle. Precisely, one of the inconveniences of the hydraulic brake lines is found in the connections between brake pipes and brake hoses.

The present invention refers to a brake pipe connection to a brake hose, for the configuration of a hydraulic brake line, pursuant to DIN 74234, SAE J1401 and FMVSS 106 regulations. Particularly, the connection is especially suitable for brake hoses of an internal diameter of approximately 3.175 mm (⅛") connected to brake pipes with a larger external diameter than the said internal diameter. One of the most widely used pipes in hydraulic brake lines is the one known as bundy tube. This bundy tube is made mainly of steel coated in a copper layer. Additionally, it can also be zinc coated with an additional polymeric coating to improve its corrosion resistance. The bundy tube is highly rigid and, therefore, it has less expansion volume when hydraulic fluids circulate through it at a very high pressure.

The difficulty posed by the brake pipe connection to a brake hose focuses mainly on the strict compliance with the choking or constriction requirements of the aforementioned regulations. Specifically, said regulations require that once assembled both tubes need to have a section for the passage of hydraulic fluid with a nominal internal diameter higher than 64% of the nominal internal diameter of the brake pipe, along the entire course of the hydraulic circuit.

Nowadays, the connection of a brake pipe to a brake hose of an internal diameter of approximately 3.175 mm (⅛"), pursuant to DIN 74234, SAE J1401 and FMVSS 106 regulations, can be performed in the following ways.

The first of them requires the use of an independent connection pipette. Said pipette has an external diameter which coincides, considering certain allowances, with the internal diameter of the brake hose. The connection also requires the use of a fixing bushing capable of housing the connection pipette inside it and receiving both the brake pipe and the brake hose through its ends. The assembly process begins with the insertion of the brake pipe in the bushing enabled to that end. Next, the bushing end is pressed to keep it together with the pipe, so that any of the components may move during the welding stage. The welding is carried out by capillarity inside a furnace and it requires a previous supply of copper between the brake pipe and the bushing end. The welding serves to guarantee the tightness of the connection between the brake pipe and the bushing and to make sure that the union is not destroyed when the assembly is subjected to certain traction forces. After the welding is performed, there is an electrolytic coating stage needed to avoid corrosion. The pipette is later inserted on the inside of the bushing, thus communicating the inlet hole in the brake pipe for the hydraulic fluid with the inlet hole in the pipette. After that, the brake hose is inserted in the other end of the bushing until the pipette is inserted under pressure on the inside of the brake hose, thus communicating the inlet hole in the pipette with the inlet hole in the brake hose. Finally, the rest of the bushing is pressed to increase the brake hose fixing and guaranteeing the tightness of the connection. This connection mode is normally used in steel braided hoses.

In the second connection mode known the pipette is not independent but it is integrated in fixing bushing itself. In spite of this noticeable difference, the assembly process coincides with the previously described one, the only difference being that it is not necessary to insert the pipette in the bushing as it is integrated therein. This connection mode is normally used in rubber hoses.

The main problems of the aforementioned processes are found in the welding and electrolytic coating stages.

As regards the inconveniences of the welding stage, once the brake pipe is inserted in the bushing end and said end is pressed so that both elements are kept together, it is put in the furnace to carry out the said welding stage. Since the bushing and the brake pipe are joined together, the welding stage makes it inevitable to put considerably large pieces in the furnace, according to the configuration required by the hydraulic brake line. Said pieces are hard and uncomfortable to manipulate and process, besides considerable increasing the welding time, and therefore the efficiency of the processes is reduced, as a smaller number of pieces can be fitted in the furnace than when the pieces have a smaller volume. Furthermore, bigger furnaces are also needed, which increases power consumption. Another inconvenience of the welding stage is that it does not allow using brake pipes with polymeric coating since putting them in the furnace would destroy said coating. The brake pipes with polymeric coatings, besides offering an excellent corrosion resistance, do not leave any residue when handled, and the end forming and brake pipe bending processes are therefore cleaner. Since the brake pipe with polymeric coating cannot be used, an electrolytic coating stage becomes necessary.

As regards the inconveniences of the electrolytic coating stage, it poses the same problems previously described regarding the welding stage, insofar as the uncomfortable handling of considerably large pieces through the electrolytic coating and efficiency reduction of the process. Besides, the corrosion resistance provided by the electrolytic coating is noticeably lower than the corrosion resistance offered by the polymeric coating, which also features a more reliable quality control through simple visual verification.

The present invention satisfactorily solves the aforementioned problems thanks to an assembly procedure, which is much more efficient and less expensive than the aforementioned processes, does not need the welding and electrolytic coating stages, enables to use brake pipes with polymeric coating and is based on a connection that integrates the connection pipette at the end of the brake pipe.

DESCRIPTION OF THE INVENTION

In order to solve the aforementioned problems, the brake pipe connection to a brake hose of the present invention uses a fixing bushing through which a brake hose is inserted through a first side of the bushing and the brake pipe is inserted through a second side of the bushing opposite to the first side.

The brake pipe has an external diameter $D_T$, a wall thickness $e_T$ and a connection end, while the brake hose has an internal diameter $d_H$, being $D_T$ larger than $d_H$.

The connection end of the brake pipe comprises a built-in pipette housed on the inside of the fixing bushing and snapped in the brake hose. The built-in pipette comprises an axial hole which has an internal diameter $d_P$. Said built-in pipette is formed on the brake pipe, before it is inserted in the fixing bushing, by means of stretching the connection end to obtain a pipette external diameter $D_P$ smaller than $D_T$, a pipette wall thickness $e_T$ smaller than $e_T$, a pipette length $L_P$ and an internal diameter $d_P$ of the axial hole.

Additionally, the brake pipe has a retaining ring, next to the connection end, which has a double function. One of them is to act as a cap, stopping the insertion of the built-in pipette through the second side of the fixing bushing. The other function consists of acting as a fixing element, facilitating the insertion of the built-in pipette in the brake hose. Since there are certain allowances between the internal diameter $d_H$ of the brake hose and the external diameter $D_P$ of the built-in pipette, it is necessary to exert certain force to insert the built-in pipette in the brake hose. The retaining ring represents a bearing point to exert said force without causing distortions in the rest of the brake pipe or in the bendings formed therein. The retaining ring can be formed on any kind of brake pipe; however, it is especially suitable for long brake pipes or for brake pipes of a considerable length which can undergo bulging or distortions. Short brake pipes normally lack of the said retaining ring.

The built-in pipette also comprises an embossment on its external surface to guarantee the tightness of the union between the brake pipe and the brake hose. This embossment is especially suitable for stainless steel braided hoses; however, it is also functional for rubber hoses. The built-in pipettes without embossment, that is to say, with a flat surface, are more suitable for rubber hoses.

The fixing bushing also comprises a cogged internal outline, continuously distributed on its internal surface. Said cogged outline guarantees the tightness of the union between the brake hose and the brake pipe once the fixing bushing is pressed.

The connection of the present invention is especially suitable for using it in hydraulic brake lines of motor vehicles. However, it can also be used in fuel supply systems or refrigeration systems.

The following description refers to an assembly process of a hydraulic brake line comprising at least one brake pipe and one brake hose, according to the present invention.

The assembly process of the present invention starts from the supply of the brake pipe and the brake hose, previously cut and optionally bent according to the requirements of the hydraulic brake line. The present invention is especially suitable for the use of brake pipes with polymeric coatings to avoid the welding stage as well as the electrolytic coating stage.

Once the brake pipe and the brake hose are fitted out under the aforementioned conditions, the assembly process of the present invention includes the following stages:
   a) stretching of the connection end to form the built-in pipette, reducing the external diameter $D_T$ and the wall thickness $e_T$, until reaching the desired values of the external diameter $D_P$ of the built-in pipette, the wall thickness $e_P$ of the built-in pipette, the length $L_P$ of the built-in pipette and the internal diameter $d_P$ of the axial hole;
   b) inserting the brake hose through the first side of the fixing bushing and inserting the built-in pipette through the second side of the fixing bushing, being the built-in pipette inserted in the brake hose;
   c) pressing of the fixing bushing.

Additionally, before stage a) the following stage can take place:
   d) configuring the retaining ring next to the brake pipe connection;

Stage d) is especially suitable when brake pipes are long, as it has been indicated before.

If a brake pipe without polymeric coating is used, the following additional stage is necessary before stages a) or d) in order to improve corrosion resistance:
   e) electrolytic coating of the brake pipe.

BRIEF DESCRIPTION OF THE DRAWINGS

The following is a brief description of a series of drawings which will help understand the invention better and which relate to an embodiment of said invention which is presented as a non-limiting example thereof.

PREFERRED EMBODIMENT OF THE INVENTION

Figure 1:
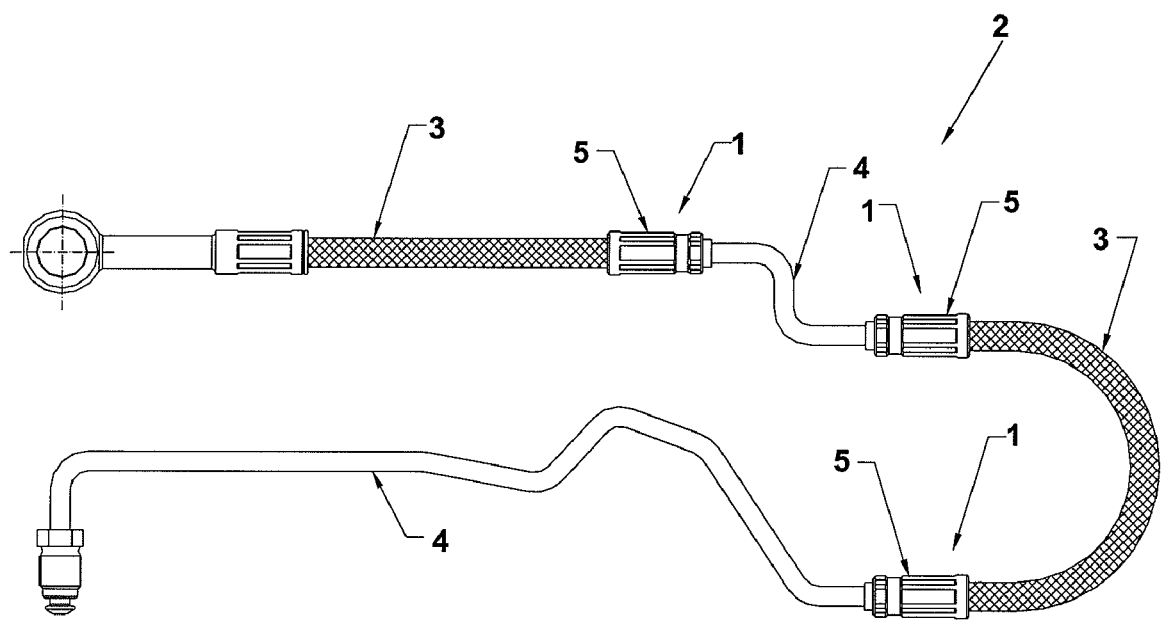
FIG. 1 represents a hydraulic brake line with the connection of the present invention.

FIG. 1 shows a hydraulic brake line (2) with a plurality of connections (1) between a brake hose (3) and a brake pipe (4), according to the present invention. In this figure the connecting bushing (5) can also be appreciated.

Figure 2A:
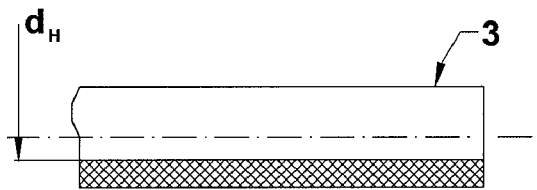
FIGS. 2a, 2b and 2c represent a sectional exploded view of the connection of the present invention for a stainless steel braided hose.
Figure 2B:
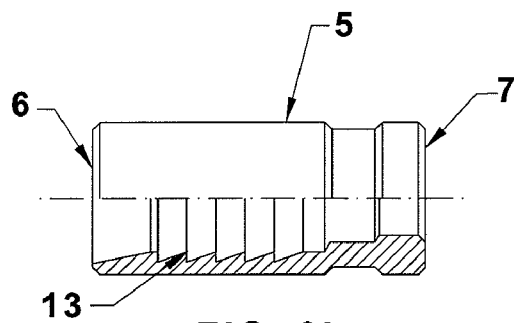
Figure 2C:
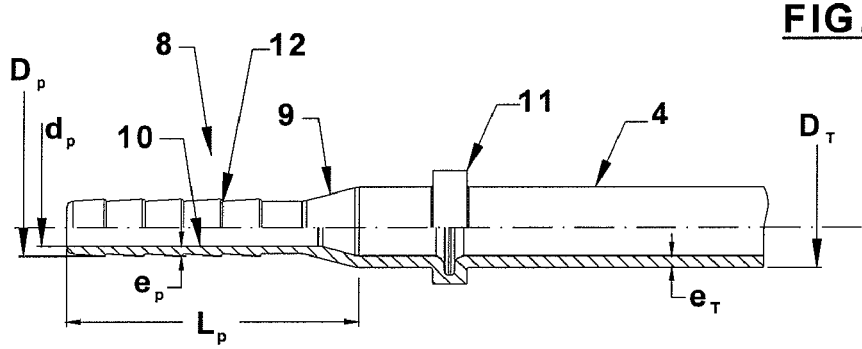

FIGS. 2a, 2b and 2c show a sectional exploded view of the connection (1) of the present invention for a stainless steel braided hose (3).

FIG. 2a shows a stainless steel braided hose (3). It can be appreciated that the brake hose (3) has an internal diameter $d_H$.

FIG. 2b shows the fixing bushing (5) with a first side (6) and a second side (7) opposite to the first side (6). In this figure, it can be appreciated that the fixing bushing (5) has a cogged internal outline (13), continuously distributed on the internal surface thereof, which serves to guarantee the tightness of the union between the brake hose (3) and the brake pipe (4) once the fixing bushing (5) is pressed.

FIG. 2c shows the brake pipe (4) which has an external diameter $D_T$, a wall thickness $e_T$, and a connection end (8). It can be appreciated that the external diameter $D_T$ of the brake pipe (4) is larger than the internal diameter $d_H$ of the brake hose (3).

The connection end (8) comprises a built-in pipette (9) with an axial hole (10) with an internal diameter $d_P$. Said built-in pipette (9) is formed on the brake pipe (4), before it is inserted in the fixing bushing (5), through the stretching of the connection end (8) in order to obtain an external diameter of the pipette $D_P$ smaller than $D_T$ a wall thickness of the pipette $e_P$ smaller than $e_T$, a length of the pipette $L_P$ and an internal diameter $d_P$ of the axial hole (10). Additionally, the brake pipe (4) has a retaining ring (11), next to the connection end (8), which serves to stop the insertion of the built-in pipette (9) through the second side (7) of the fixing bushing (5), as it can be seen in FIGS. 3 and 4, besides serving to facilitate the insertion of the built-in pipette (9) in the brake hose (3) avoiding any type of distortion on the brake pipe (4).

The built-in pipette (9) comprises an embossment (12) on the external surface to guarantee the tightness of the union between the brake pipe (4) and the brake hose (3).

Figure 3:
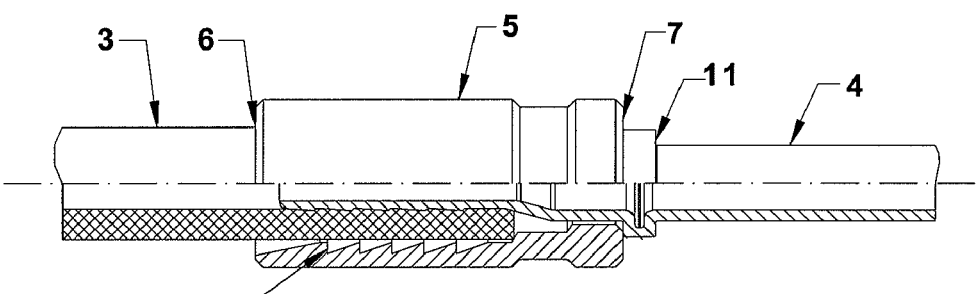
FIG. 3 represents a sectional view of the connection of the present invention for a stainless steel braided hose.

FIG. 3 shows a sectional view of the connection (1) of the present invention for a stainless steel braided hose (3). In this figure it can be seen that the brake hose (3) is inserted through the first side (6) of the fixing bushing (5), while the brake pipe (4) is inserted through the second side (7) of the fixing bushing (5). It can also be appreciated that the built-in pipette (9) is housed on the inside of the fixing bushing (5) and inserted in the brake hose (3).

Figure 4:
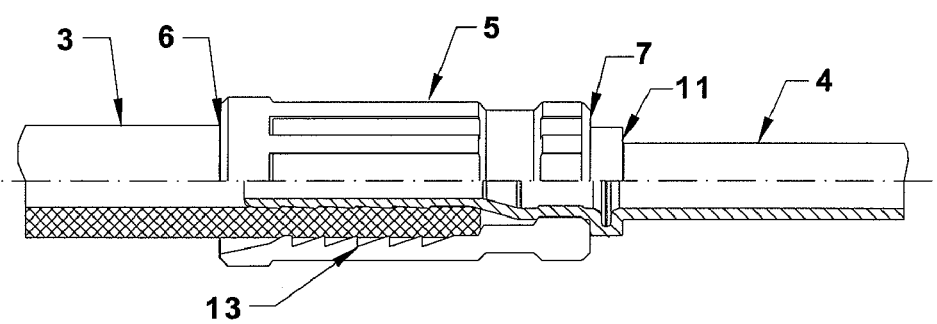
FIG. 4 represents a sectional view of the connection of the present invention for a stainless steel braided hose after pressing the fixing bushing.

FIG. 4 shows a sectional view of the connection (1) of the present invention for a stainless steel braided hose (4) after pressing the fixing bushing (5). In this figure it is possible to appreciate that the cogged internal outline (13) has a bearing on the external surface of the brake hose (3) to guarantee the tightness of the union between the brake hose (3) and the brake pipe (4) once the fixing bushing (5) is pressed. It can also be appreciated that the length of the pipette $L_P$ exceeds the pressing area to avoid constrictions in the brake hose.

Figure 5A:
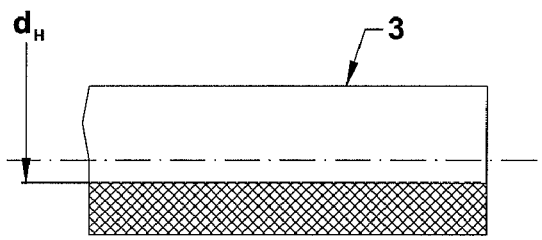
FIGS. 5a, 5b and 5c represent a sectional exploded view of the connection of the present invention for a rubber hose.
Figure 5B:
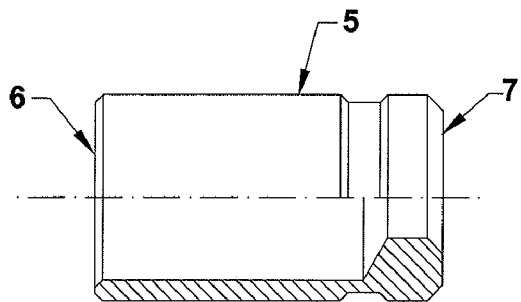
Figure 5C:
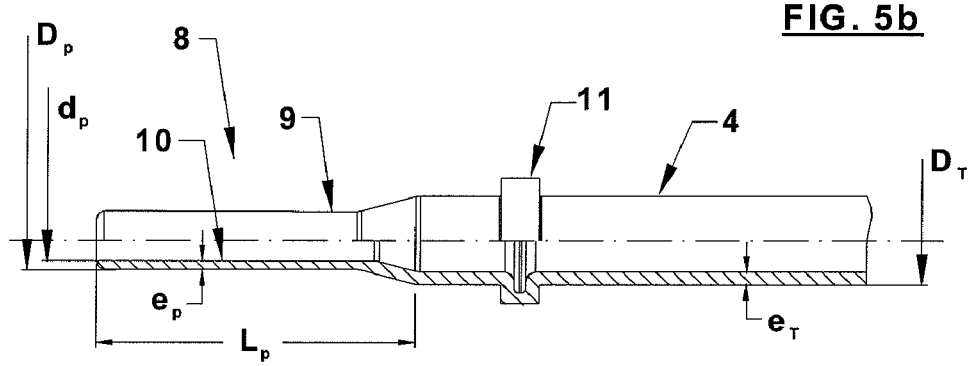

FIGS. 5a, 5b and 5c show a sectional exploded view of the connection (1) of the present invention for a rubber hose (3).

FIG. 5a shows the rubber hose (3).

FIG. 5b shows the fixing bushing (5) with an internal flat surface.

FIG. 5c shows a brake pipe (4) with a connection end (8) which comprises a built-in pipette (9) with an external flat surface.

Figure 6:
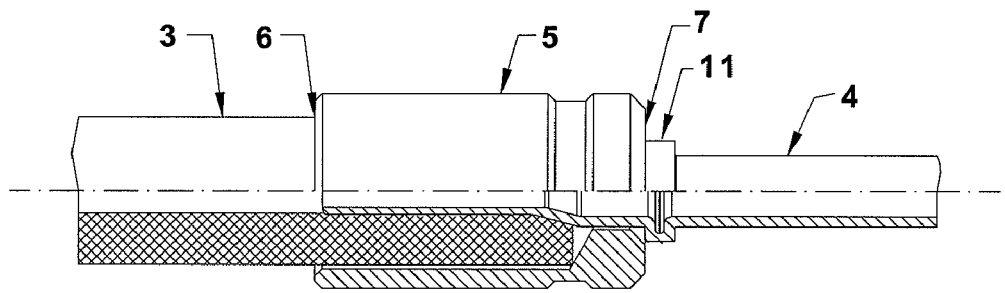
FIG. 6 represents a sectional view of the connection of the present invention for a rubber hose.

FIG. 6 shows a sectional view of the connection (1) of the present invention for a rubber hose (3).

Figure 7:
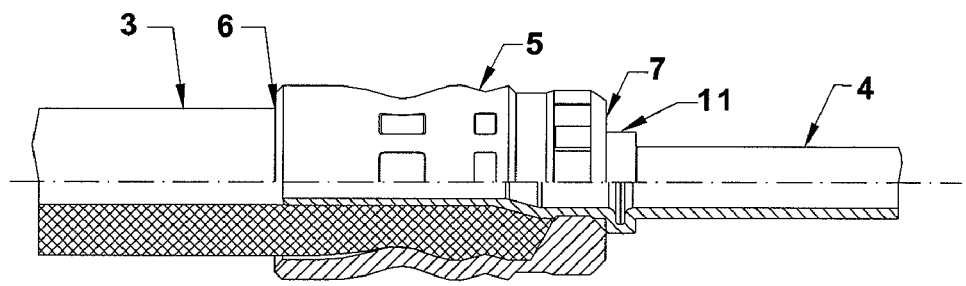
FIG. 7 represents a sectional view of the connection of the present invention for a rubber hose after pressing the fixing bushing.

FIG. 7 represents a sectional view of the connection (1) of the present invention for a rubber hose (3) after pressing the fixing bushing (5). In this figure it can be appreciated that the length of the pipette $L_P$ exceeds the pressing area to avoid constrictions in the brake hose.

FIGS. 8a, 8b, 8c, 8d, 8e and 8f represent a sequence of the formation stages of the built-in pipette (9) in the connection end (8) of the brake pipe (4) for connecting it to a brake hose (3) with an internal diameter $d_H$ of approximately 3.175 mm (⅛").

Figure 8A:
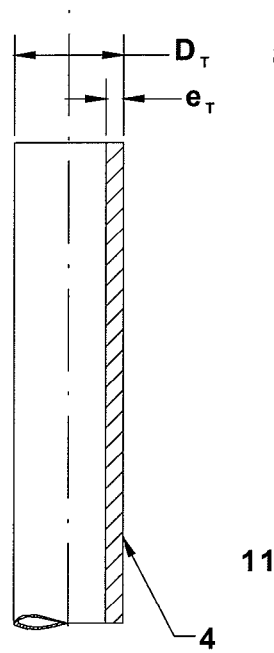
FIGS. 8a, 8b, 8c, 8d, 8e and 8f represent a sequence of the formation of the built-in pipette in the end of the connection of the brake pipe for connecting it to a brake hose with an internal diameter of approximately 3.175 mm (⅛").

FIG. 8a shows a brake pipe (4) with an external diameter $D_T$ of approximately 4.76 mm and a wall thickness $e_T$ of approximately 0.75 mm.

Figure 8B:
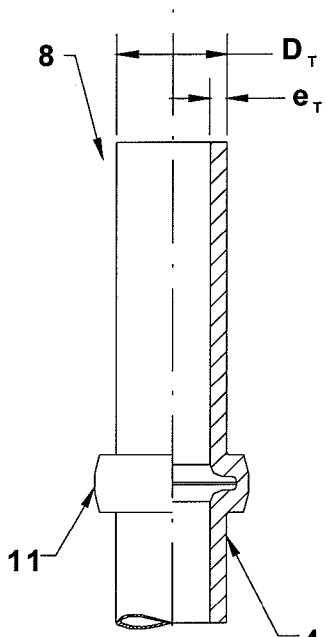

FIG. 8b shows a brake pipe (4) in which a retaining ring (11) has been configured next to the connection end (8).

Figure 8C:
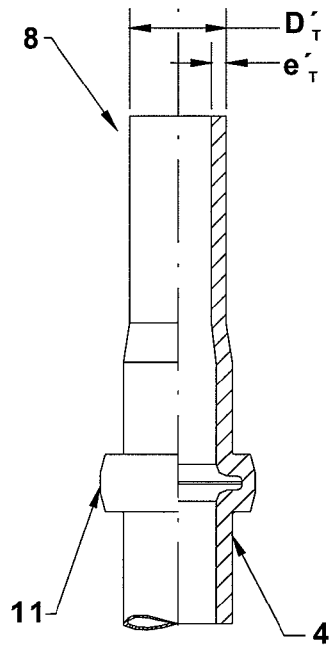

FIG. 8c shows the result of a first stage of stretching of the connection end (8) in order to obtain the built-in pipette (9), where it can be appreciated that the external diameter $D_T$ is reduced up to a $D'_T$ value of approximately 4.22 mm and the wall thickness $e_T$ is reduced up to an $e'_T$ value of approximately 0.65 mm. At the same time an increase of the connection end (8) length of the brake pipe (4) can be appreciated.

Figure 8D:
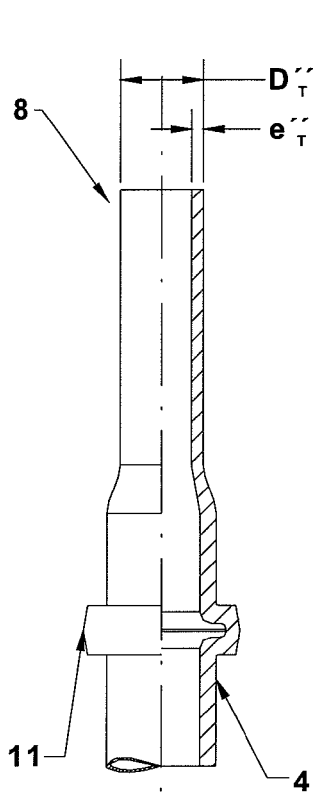

FIG. 8d shows the result of a second stage of stretching of the connection end (8) in order to obtain the built-in pipette (9), where it can be appreciated that the external diameter $D_T$ is reduced up to a $D''_T$ value of approximately 3.62 mm and the wall thickness $e_T$ is reduced up to a $e''_T$ value of approximately 0.51 mm. A new increase of the connection end (8) length of the brake pipe (4) can also be appreciated.

Figure 8E:
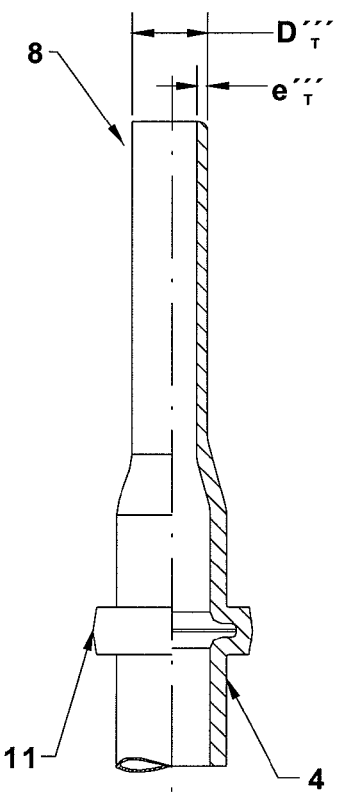

FIG. 8e shows the result of a third stage of stretching of the connection end (8) in order to obtain the built-in pipette (9), where it can be appreciated that the external diameter $D_T$ is reduced up to a $D'''_T$ value of approximately 3.41 mm and the wall thickness $e_T$ is reduced up to a $e'''_T$ value of approximately 0.45 mm. A new increase of the connection end (8) length of the brake pipe (4) can also be appreciated.

Figure 8F:
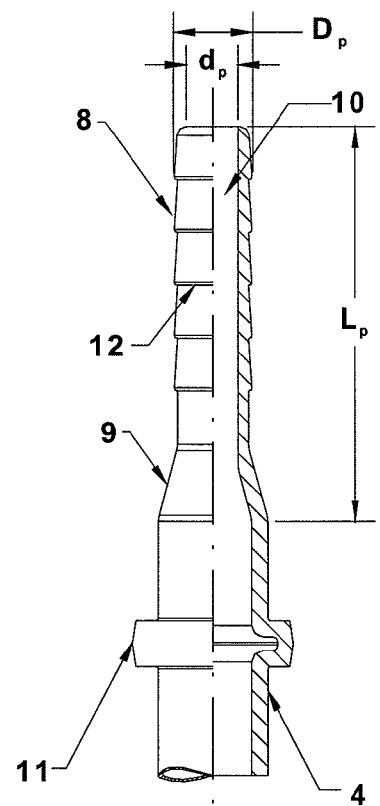

FIG. 8f shows the built-in pipette (9), as the result of a fourth and final stage of stretching the connection end (8). In this figure it can be appreciated that the built-in pipette (9) has a pipette external diameter $D_T$ and a pipette length $L_P$, being said pipette length $L_P$ equal or bigger than the bushing (5) pressing area in order to avoid constrictions. At the same time, the built-in pipette (9) has an axial hole (10) of an internal diameter $d_P$ of an approximate value of 2.2 mm, larger than the approximately 2.03-2.05 mm which would be established by the regulations DIN 74234, SAE J1401 and FMVSS 106 for this case.

FIG. 8f also shows that there is an embossment (12) on the external surface of the built-in pipette (9). After forming this embossment (12), the external diameter of the pipette $D_P$ reaches an approximate value of 3.4 mm, noticeably larger than the approximate 3.175 mm (⅛") of the internal diameter $d_H$ of the brake hose (3). The difference between both diameters makes it necessary to snap the built-in pipette (9) inside the brake hose (3), while at the same time; it also guarantees the tightness of the union between the brake pipe (4) and the brake hose (3).

In built-in pipettes without embossment, that is to say, with a flat outer surface, it is also recommended but not mandatory for the external diameter of the pipette $D_P$ to be larger than the internal diameter $d_H$ of the brake hose (3) to guarantee the tightness of the union.

The invention claimed is:
1. Assembly process of a hydraulic brake line for motor vehicles comprising at least one brake pipe and one brake hose, where the brake pipe and one brake hose are previously cut according to the specific needs and requirements of the hydraulic brake line, wherein it comprises the following stages:

a) stretching of the connection end to form a built-in pipette, reducing the external diameter $D_T$ and the wall thickness $e_T$, until reaching the desired values of the external diameter $D_P$ of the built-in pipette, the wall thickness $e_P$ of the built-in pipette, the length $L_P$ of the built-in pipette and the internal diameter $d_P$ of the axial hole;

b) inserting the brake hose through a first side of a fixing bushing and inserting the built-in pipette through a second side of the fixing bushing, and inserting the built-in pipette in to the brake hose;

c) pressing of the fixing bushing.

2. Assembly process of a hydraulic brake line according to claim 1 wherein it also comprises the following stage before stage a):

d) configuring the retaining ring of the brake pipe next to the connection end.

3. Assembly process of a hydraulic brake line according to claim 2, wherein it also comprises the following stage before stages a) or d):

e) electrolytic coating of the brake pipe.

* * * * *